(12) United States Patent
Engel et al.

(10) Patent No.: US 8,300,153 B2
(45) Date of Patent: Oct. 30, 2012

(54) VIDEO SELECTION DISPLAY UNIT FOR MULTIPLE DEVICES

(75) Inventors: Richard Engel, Ridge, NY (US);
Robert Spinner, East Northport, NY (US); William Harold Leippe, Coram, NY (US)

(73) Assignee: Advanced Testing Technologies, Inc., Hauppauge, NY (US)

( * ) Notice: Subject to any disclaimer, the term of this patent is extended or adjusted under 35 U.S.C. 154(b) by 1273 days.

(21) Appl. No.: 12/043,183

(22) Filed: Mar. 6, 2008

(65) Prior Publication Data

US 2009/0225228 A1 Sep. 10, 2009

(51) Int. Cl.
| H04N 5/44 | (2011.01) |
| G06F 11/00 | (2006.01) |
| G01R 19/00 | (2006.01) |
| G01R 21/00 | (2006.01) |
| G01R 23/00 | (2006.01) |
| G01R 11/32 | (2006.01) |

(52) U.S. Cl. ...................................... 348/725; 714/100
(58) Field of Classification Search .................. 348/725; 324/74; 330/2; 714/100
See application file for complete search history.

(56) References Cited

U.S. PATENT DOCUMENTS

| 5,438,375 A | 8/1995 | Sasabe et al. |
| 5,553,609 A | 9/1996 | Chen et al. |
| 5,815,216 A | 9/1998 | Suh |
| 6,072,541 A | 6/2000 | Song |
| 6,122,018 A | 9/2000 | Sugihara et al. |
| 6,717,609 B2 | 4/2004 | Sugimoto et al. |
| 7,734,976 B2 * | 6/2010 | Barrett ........................... 714/744 |
| 7,921,343 B2 * | 4/2011 | Ono ............................... 714/724 |
| 7,972,266 B2 * | 7/2011 | Gobeyn et al. ................. 600/301 |
| 7,984,346 B2 * | 7/2011 | Seo ................................ 714/724 |
| 8,082,786 B1 * | 12/2011 | Akins et al. ................. 73/379.01 |
| 2002/0147804 A1 * | 10/2002 | Cosmao et al. ............... 709/223 |
| 2003/0193577 A1 | 10/2003 | Doring et al. |
| 2004/0143847 A1 | 7/2004 | Suzuki et al. |
| 2005/0052527 A1 | 3/2005 | Remy et al. |
| 2009/0051765 A1 | 2/2009 | Moberly |

FOREIGN PATENT DOCUMENTS

| EP | 1126715 A2 | 8/2001 |
| WO | 2007092660 A1 | 8/2007 |

OTHER PUBLICATIONS

International Search Report for PCT/US2009/001214, dated Oct. 16, 2009.
Written Opinion of the International Searching Authority for PCT/US2009/001214, dated Oct. 16, 2009.
Communication from European Patent Office dated Jul. 7, 2011 for related European Patent Application No. 09 716 798.5 including Supplementary European Search Report.

* cited by examiner

*Primary Examiner* — Dominic D Saltarelli
(74) *Attorney, Agent, or Firm* — Brian Roffe

(57) ABSTRACT

Video selection display unit that is capable of routing real-time output signals having a video component from different video signal sources, e.g., different instruments or home entertainment devices, to a single output for display on a monitor or other type of video display. The video selection display unit may be part of an automatic test system or home entertainment system. Control of the video selection display unit can be effected locally via a user interface, such as one or more pushbuttons, and/or remotely over a network which may be the same network used for communication with the instruments or devices or using an infrared remote control unit.

22 Claims, 3 Drawing Sheets

VIDEO SELECTION DISPLAY UNIT FOR MULTIPLE DEVICES

FIELD OF THE INVENTION

The present invention relates generally to the field of automatic test systems incorporating 'faceless' instrumentation (i.e., instruments lacking a display), and more particularly, to automatic test equipment that provides real-time video output for display on a monitor.

The present invention also relates to the field of entertainment, e.g., home entertainment, wherein it enables multiple entertainment devices which generate A/V (audio/video) signals to share a single display device which receives input from the selected entertainment device under program control, for example, via an infrared signal or a local area network (LAN).

BACKGROUND OF THE INVENTION

Automatic test equipment manufacturers are heading in the direction of providing instrumentation that does not incorporate a video display on the instrumentation. One such form factor that typically does not utilize a display is LXI (LAN eXtensions for Instrumentation). The removal of the display from each instrument in a large rack, or the initial and intentional fabrication of one or more instruments without a display, provides several advantages including, for example, a reduction in costs for the instrumentation, a reduction in space requirements for the instrumentation on the rack, a reduction in power consumption since there is no display which requires power, and a unified look to the instrumentation.

When a user wants or needs a display, test equipment manufacturers typically offer a real-time video output as an option to which a display monitor may be connected. Thus, for every instrument providing a video output and needing a display, there would be a dedicated display. This results in the presence of multiple displays in the automatic test equipment.

The same situation arises in modern homes wherein there are several entertainment devices which generate output signals having both a video component and an audio component for a video monitor or display. As such, the home would include multiple displays, one for each entertainment device, possibly leading to clutter in the home or the end user needing to manually disconnect and connect cables each time a different device is used. Moreover, as connectivity standards change, newer video displays, i.e., televisions/monitors, have only limited connections for older home entertainment devices which could prevent all of the older home entertainment devices from being connected simultaneously to the newer television/monitor. This would require the homeowner to continually change the connections to the television/monitor when each home entertainment device is used.

OBJECTS AND SUMMARY OF THE INVENTION

It is an object of the present invention to provide an automatic test system which is capable of selectively displaying real-time video signals from a plurality of instruments on a single monitor display.

It is another object of the present invention to provide a selection device which is capable of selecting output signals from a plurality of entertainment devices which generate output signals having both a video component and an audio component that can be output to a common monitor or display.

In order to achieve one or both of these objects and others, in one embodiment of the present invention, a video selection display unit is provided which is capable of routing output signals, e.g., output signals including only a video component or both a video component and an audio component, from a plurality of different signal sources, e.g., different instruments or different entertainment devices, to a single output for display on a monitor or other type of display. Control of the video selection display unit can be effected locally via a user interface, such as one or more pushbuttons, and/or remotely over a network which may be the same network used for communication with the instruments or using an infrared remote control unit.

When primarily used with automatic test systems, the video selection display unit preferably is able to accommodate various different graphics standards (i.e., VGA, SVGA, XGA, etc.) in view of its ability to synchronize with a variety of horizontal and/or vertical refresh rates. When display of instrument data is not desired, the video selection display unit may be controlled to blank the display, i.e., disconnect the output from inputs connecting to the different video signal sources.

BRIEF DESCRIPTION OF THE DRAWINGS

The following drawings are illustrative of embodiments of the invention and are not meant to limit the scope of the invention as encompassed by the claims.

DETAILED DESCRIPTION OF PREFERRED EMBODIMENTS

Figure 1:
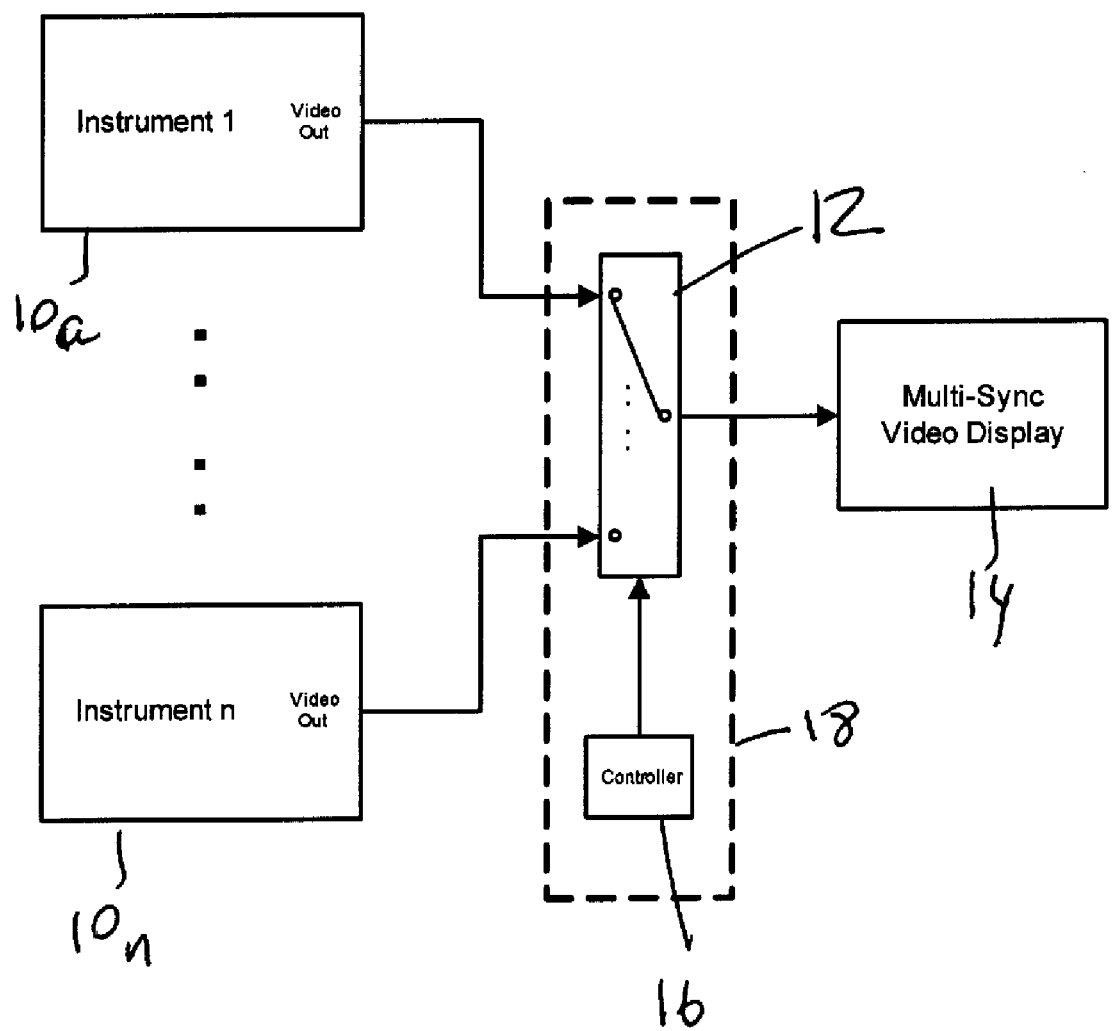
FIG. 1 shows one embodiment for routing real-time video signals to a display monitor in accordance with the invention.
Figure 2:
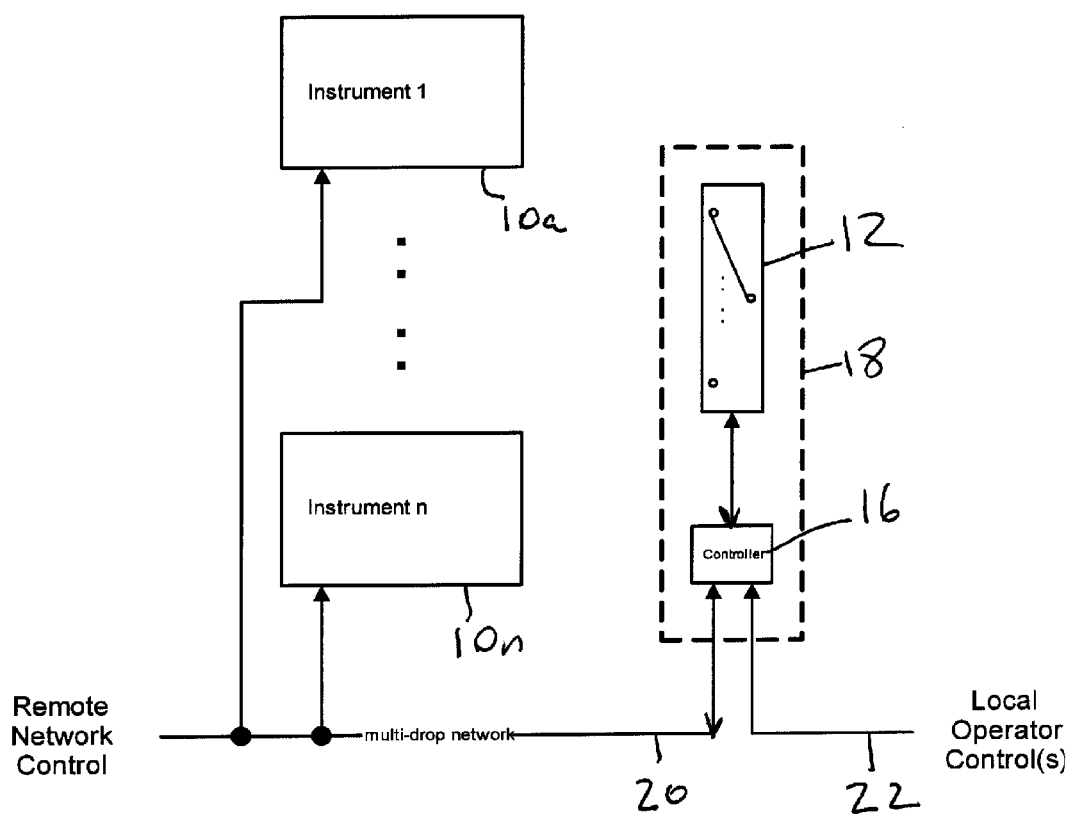
FIG. 2 shows one embodiment for controlling video selection display unit remotely and locally in accordance with the invention.
Figure 3:
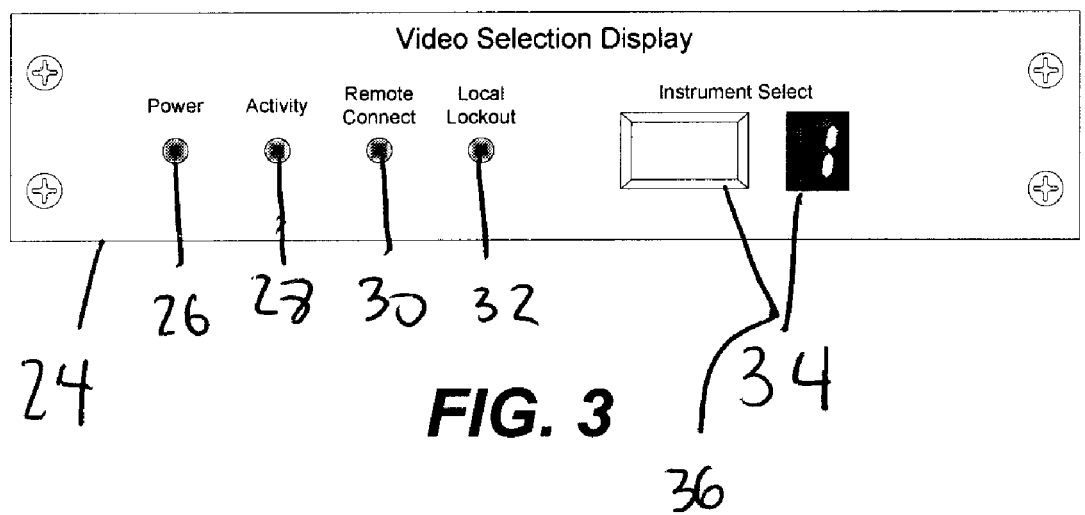
FIG. 3 shows one embodiment of pushbutton and indicator controls for a video selection display unit in accordance with the invention.

FIGS. 1-3 are described with reference to the application of an arrangement and method in accordance with the invention for selectively routing output signals having only a video component from selected instruments of automatic test equipment (ATE) to a single monitor. It should be understood that the inventive arrangement and method may be applied in other situations wherein output signals from multiple devices are selectively routed to a single monitor or other type of display device, e.g., the home entertainment situation mentioned above. Therefore, although FIGS. 1-3 mention the use of instruments which generate video signals, it should be understood that such instruments are exemplifying devices used in particular when the invention is applied to automatic test equipment and the broader, more generic term "devices" encompasses instruments as well as other types of devices. Moreover, in the automatic test equipment situation, the output signals from the instruments include generally only a video component. However, in other situations, the output signals may also include an audio component as well, e.g., the home entertainment situation. As such, although the description of FIGS. 1-3 mentions only routing of output signals having a video component or video output signals, it should be understood that the output signals from the devices may have only a video component as described or both a video component and an audio component. Thus, the inventions are not limited to any particular form of output signals and all that is required is that the single monitor or display is capable of handling the type or types of output signals from the devices.

Referring to the accompanying drawings wherein the same reference numerals refer to the same or similar elements, FIG. 1 is a simplified block diagram of an exemplifying arrangement for routing a plurality of video signals to a display monitor in accordance with the invention. As can be seen in this simplified block diagram, each output signal from an instrument 10a, . . . , 10n includes a plurality of signals (e.g., RGB components, horizontal sync, vertical sync, etc.) which switch as an aggregate group via a switching component 12 interposed between the instruments 10a, . . . , 10n and a compatible video display 14. Switching component 12 could be implemented in the form of banks of relays, CMOS analog switches or the like and combinations thereof, which are controlled by a controller 16. Switching component 12 and controller 16 may be housed in a common housing and considered part of a video selection display unit 18. Since the switching component 12 associated with the display 14 is passive, the switching component 12 is able to accommodate various different graphics standards (such as VGA, SVGA, XGA, etc.) because they share the same pin definition. This shifts the burden of synchronizing the various horizontal and vertical refresh rates to the display 14. Of course, the display 14 should be selected to enable such synchronization because if not, it will be limited in the video output which it can display.

Any test system incorporating 'faceless' instrumentation, i.e., instruments 10a, . . . , 10n without associated display monitors or other video displays, could make use of the video selection display unit 18 if the instrumentation includes provisions for a video output option. At least one instrument 10a, . . . , 10n supporting such video output would be connected to the video selection display unit 18. Typically, most, if not all of the instruments in the automatic test system or equipment which provide a video output yet lack a video display would be coupled to the switching component 12, each to a dedicated/unique input of the switching component 12.

In one embodiment of the invention, control of the video selection display unit 18 is accomplished via the same or overlapping means which control the instrumentation, i.e., instruments 10, . . . , 10n, as shown in FIG. 2. A multi-drop network 20 such as a wired Ethernet/LAN (local area network) communication bus could be used. Alternate means of remote communication might include serial (RS-485, USB, etc.), parallel (GPIB, MXI, etc.), RF (Bluetooth, Wi-Fi, Zigbee, UWB, etc.) or optical (IR, fiber-optic, etc.) as well. The network 20 is connected to each of the instruments 10a, . . . , 10n and the controller 16.

Remote control of the video selection display unit 18 may include at least the ability to command the controller 16 to select a particular input to connect to the single output of the switching component 12 and thereby cause the video component of the output signals from one of the instruments 10a, . . . , 10n connected to the selected input to be displayed on the video display 14. When it is not desirable to display instrumentation data (i.e., secure information), the controller 16 could be commanded to blank the video display 14 (disconnect the output from all inputs from instruments 10a, . . . , 10n). In one embodiment, the controller 16 is provided with the ability to lock out local operator control, effected via a local control line 22, so that a blanked display could not be overridden via local controls. This would be provide added security when remotely controlling the controller.

The video display selection unit 18 could also be commanded to remotely query the currently selected input from one of the instruments 10a, . . . , 10n, e.g., sample the video component of the output signal being provided by one of the instruments 10a, . . . , 10n to its connected input of the switching component 12. The video selection display unit 18 could also be commanded to sense whether an input from an instrument 10a, . . . , 10n is active, i.e., an output signal is being generated by the instrument and provided to the connected input of the switching component 12, and convey that information, for example back over the network 20 if the command was received over the network 20 as a form of closed loop system built-in test.

Local control of the video selection display unit 18 via local control line 22 may include at least the ability to cycle through the active inputs of the switching component 12 connected to the instruments 10a, . . . , 10n via a pushbutton or other user interface device. The video selection display unit 18 could include visual feedback to reflect the selected input from the instruments 10a, . . . , 10n in the form of one or more illuminated indicators, one or more alpha-numeric indicators, combinations thereof and the like. Additionally or alternatively, the video selection display unit 18 could include one or more other visual indicators to convey operational status to the user. Illuminated indicators could be provided to reflect various operating conditions or parameters such as application of power, remote connection status, processor activity and local lockout mode status. When local control has not been locked out remotely (as discussed above), selection of a source for a video signal from one of the instruments 10a, . . . , 10n could be effected either remotely or locally. To do so, the controller 16 within the video selection display unit 18 would need to keep track of the currently selected video input as well as the active inputs connected to it.

In this regard, FIG. 3 shows an exemplifying housing 24 of a video selection display unit 18 including on one side, a power indicator 26 which is illuminated when the video selection display unit 18 receives power, an activity indicator 28 which is illuminated when the video selection display unit 18 is active, a remote connect indicator 30 which is illuminated when the video selection display unit 18 is connected to means which provide for remote control thereof, e.g., a network as discussed above, and a local lockout indicator 32 which is illuminated when local control over the video selection display unit 18 has been locked out from a remote location, in the manner described above. Further, the housing 22 includes a display 34 which indicates, for example, the instrument 10a, . . . , 10n whose output is being conveyed by the video selection display unit 18 to the display 14, and a pushbutton 36 which can be used to manually select one of the instruments 10a, . . . , 10n to provide video signals through the switching component 12 to the display 14. Although not shown, an infrared receiver may be arranged in the housing 24 and a remote control unit with an infrared transmitter provided to allow stepping and direct control of the controller 16 via remote control.

To provide for its functions described above, controller 16 may include a logic unit, state machine or processor, memory components and other software and hardware components which, individually or in combination, effect control and execute programs. Connections would also be provided between the various components of the controller 16 and the various elements of the switching component 12, e.g., the relays and analog switches.

The video selection display unit 18 may also include a web server function to allow configuration through the use of a web browser such as Microsoft Internet Explorer® or Mozilla Firefox®. The web server would permit an operator to remotely configure the video selection display unit 18 through the use of a graphical user interface (GUI) web page.

The GUI would permit the operator to remotely set or query the settings of the video selection display unit 18. The web server function could be implemented through the controller 16.

The arrangements illustrated in FIGS. 1 and 2 can be applied in a method for managing video output in real-time from a plurality of instruments lacking displays but providing output signals having a video component. In an exemplifying embodiment of such a method, the output from each instrument 10a, . . . , 10n is connected to a respective input of the switching component 12, a single output of the switching component 12 is connected to a single video display 14, and the switching component 12 is controlled to selectively connect only one of the inputs thereof to the output thereof to enable real-time conveyance of the output from one of the instruments 10a, . . . , 10n connected to the selected input through the switching component 12 to the output of the switching component 12 and then to the display 14.

Control of the switching component 12 may be implemented through remote control and/or local control. For remote control, the instruments and controller may be connected to a common network 20, commands are directed to the controller 16 from one or more remote locations over the network 20, and the instruments 10a, . . . , 10n communicate with each other and other portions of the automatic test system over the same network 20. A controller 16 may be associated with the switching component 12 and interposed between the switching component 12 and the network 20 to convert control commands directed over the network 20 into changes of the switching component 12. For local control, one or more user interfaces, such as one or more pushbuttons, may be provided on a housing in which the switching component 12 and optional controller 16 are arranged. Each pushbutton is coupled to the switching component directly or indirectly via the controller 16 and when depressed, causes changes in the operation of the switching component 12. For example, depression of one pushbutton may cause a change in the input of the switching component 14 which is connected to the output and therefore a change in the video output on the display 14.

Various commands may be provided to the controller 16 either using the remote control or local control. When using remote control, a command may even be provided to prevent implementation of commands provided using local control. When using both remote control and local control, the controller 16 may be arranged to receive a command to select one of the inputs to connect to the output and effect a connection between the selected input and the output, a command to disconnect all of the inputs from the output and effect the same, a command to query a selected one of the inputs and provide a response to the query, and a command to detect whether a video output signal is being received at each of the inputs and convey information about which inputs are receiving video output signals.

Since the switching component 12 does not process, i.e., alter, the video output, but rather simply conveys the video output therethrough, various and different graphics standards may be conveyed from the instruments 10a, . . . , 10n to the display 14. The display 14 therefore should be provided with the means to process the various standards in order for the video output to be displayed, e.g., synchronize refresh rates.

The method may also entail providing information about which of the inputs is currently providing output to the display 14 and/or information about operational status of the video selection display unit 18. This may take the form of one or more indicators arranged on a housing in which the controller 16 and/or switching component 12 are arranged, or in a separate display control device.

Although the video selection display unit 18 is described above primarily for use with automatic test systems containing instruments, it can also be used as part of a home entertainment system including a plurality of home entertainment devices and a limited number of displays, e.g., a single display. Home entertainment devices are not all capable of simultaneous connection to the limited number of video inputs for legacy devices on newer high definition (HD) home entertainment video display devices. Although currently most new HD video devices provide only limited legacy video inputs, most users maintain multiple legacy home entertainment devices, such as VCR and DVD players.

Since the video selection display unit 18 does not process the signals being output from the legacy home entertainment devices, it does not matter what their format is and thus they may be NTSC (USA, Canada, Japan, etc.), PAL (Europe, Asia, Australia, etc.), SECAM (France, ex-USSR, Central Africa) and variants, more obscure or obsolete standards such as PALplus (PAL extension. Europe only), PAL-M (PAL variation. Brazil), MAC (Europe—Obsolete) and MUSE (Japan-analog HDTV). Newer digital standards include ATSC (USA, Canada, etc.), DVB (European, Digital Video Broadcasting), and ISDB (Japanese, Integrated Services Digital Broadcasting). However, to use some of these formats, a cable box, receiver or other conversion unit would be required to translate the video signals into processable and displayable video, e.g., a baseband video. Typically, baseband video connections between equipment can fall into many categories under both analog (Composite, Component, S-Video, D4, SCART [used in Europe]) and digital (DVI or HDMI).

There are at least two options for converting the output signals from the home entertainment devices in different formats, usually only the video component of the output signals and not the associated audio component, to a format processable and displayable by the video display. One option would be to provide the display with means to convert the video component of the incoming signals from any format into processable video signals. This would require numerous video signal converters to be associated with the video display. Therefore, the second and better option would be to provide a converter next to each home entertainment device to process the video component of the output signals from each home entertainment device before they are input to the video selection display unit 18. In this case, the video selection display unit 18 would connect at the baseband level mentioned above.

It is envisioned that a single monitor or display would not be included with the video selection display unit 18 because the homeowner would select/configure components to suit his or her needs. Thus, only the video selection display unit 18 would be sold to the homeowner. In use, the homeowner would connect a cable from the output of each home entertainment device to an input of the switching component 12 and the output of the switching component 12 of the video selection display unit 18 to an existing video display, e.g., an HD video display device. In this regard, the video selection display unit 18 may be provided with multiple, different output connectors, each having a different construction, to enable it to be used with different cables.

Having described specific, preferred embodiments of the invention with reference to the accompanying drawings, it will be appreciated that the present invention is not limited to the illustrated and described embodiments, and that various changes and modifications can be effected therein by one of ordinary skill in the art without departing from the scope or spirit of the invention as defined by the appended claims.

The invention claimed is:

1. An automatic test system for testing a unit under test, comprising:
   a plurality of measurement devices, each of said devices providing an output signal representing a measurement by the device when conducting a test of the unit under test and the output signal including a video component, each of said devices lacking an associated display on which the video component of the output signal from said device can be displayed, each of said devices comprising a test instrument that generates the output signal including the video component, said test instruments being different from one another such that different measurements from tests conducted by said devices on the same unit under test are represented by the output signals from said devices, and
   an arrangement for enabling selective and real-time display of the video component of the output signals from said devices on a single display, said arrangement comprising:
      a switching component having a plurality of inputs, each of said inputs receiving the output signal from a respective one of said devices, and a single output to the display; and
      a controller for controlling said switching component to selectively connect only one of said inputs to said single output to enable conveyance of the output signal from said device providing the output signal to said selected input through said switching component to said output of said switching component and then to the display,
      said switching component and said controller being housed in a separate housing from the plurality of devices and from the display.

2. The system of claim 1, further comprising command means arranged in connection with said housing for providing commands to said controller to effect control over said switching component.

3. The system of claim 2, wherein said command means comprise at least one pushbutton arranged in connection with said controller, said at least one pushbutton being exposed on a face of said housing.

4. The system of claim 1, wherein said controller receives software commands from a remote location over a control bus, said devices also being controlled via the same control bus.

5. The system of claim 4, further comprising local command means for providing commands to said controller to effect control over said switching component, said local command means being arranged in connection with said controller.

6. The system of claim 5, wherein said controller is arranged to receive a command from a remote location to prevent implementation of commands provided by said local command means.

7. The system of claim 1, wherein said controller is arranged to receive a command to select one of said inputs to connect to said output and connect the selected input and said output.

8. The system of claim 1, wherein said controller is arranged to receive a command to disconnect all of said inputs from said output and disconnect all of said inputs from said output such that no output is provided by said switching component.

9. The system of claim 1, wherein said controller is arranged to receive a command to query a selected one of said inputs, query the selected input and provide a response to the query.

10. The system of claim 1, wherein said controller is arranged to receive a command to detect whether an output signal is being received at each of said inputs, detect which of said inputs are receiving output signals from devices and convey information about which inputs are receiving output signals.

11. The system of claim 1, further comprising a network, the devices and said controller being connected to said network, said controller being arranged to receive commands over said network, said network being used for communications with the devices.

12. The system of claim 1, wherein said switching component includes relays and/or CMOS analog switches.

13. The system of claim 1, wherein the video component of the output signals provided by the devices include sync data, the display being arranged to synchronize refresh rates such that said switching component does not alter the video component of the output signals being passed from the devices to the display therethrough.

14. The system of claim 1, wherein said system is a video selection display unit having a housing, further comprising at least one indicator arranged on said housing to indicate at least one which of said inputs is currently providing output signals to the display or information about operational status of said system.

15. The system of claim 1, wherein said devices are test instruments that generate the output signals including the video component and an audio component.

16. The system of claim 1, wherein said devices are test instruments that generate the output signals having only the video component.

17. An automatic test system for testing a unit under test, comprising:
   a plurality of measurement devices, each of said devices providing output signals representing a measurement by the device when conducting a test of the unit under test and the output signal including a video component, each of said devices lacking an associated display on which the video component of the output signal from said device can be displayed, each of said devices comprising a test instrument that generates the output signal including the video component, said test instruments being different from one another such that different measurements from tests conducted by said devices on the same unit under test are represented by the output signals from said devices;
   a single video display for displaying the video component of the output signals from said devices in real-time; and
   a video selection display unit for enabling selective display of the video component of the output signals from said devices on said display, said video selection display unit comprising:
      a switching component having a plurality of inputs, each input receiving the output signals from a respective one of said devices, and a single output to said display; and
      a controller for controlling said switching component to selectively connect only one of said inputs to said single output to enable conveyance of the output signals from said one of said devices providing the output signals to the selected input through said switching component to said single output of said switching component and then to said display, said switching component and said controller being housed in a separate housing from the plurality of devices and from the display.

18. The system of claim 17, further comprising a network, said devices and said controller being connected to said network, said controller being arranged to receive commands over said network from a remote location, said network being used for communications with said devices.

19. The system of claim 18, further comprising local command means for providing commands to said controller to effect control over said switching component, said local command means being arranged in connection with said controller.

20. The system of claim 19, wherein said controller is arranged to receive a command from the remote location to prevent implementation of commands provided by said local command means.

21. A method for managing video output in real-time from a plurality of measurement devices of an automatic test system for testing a unit under test that lack displays but provide output signals representing a measurement by the device when conducting a test of the unit under test and the output signals having a video component, each of the devices comprising a test instrument that generates the output signal including the video component, the test instruments being different from one another such that different measurements from tests conducted by the devices on the same unit under test are represented by the output signals from the devices; the method comprising:

connecting the output from each of the devices to a respective input of a switching component;

connecting a single output of the switching component to a single video display; and controlling the switching component via a controller to selectively connect only one of the inputs to the single output to enable conveyance of the output from one of the devices connected to the selected input through the switching component to the single output of the switching component and then to the display such that the video component of the output signals from the devices that represent different measurements by the devices derived from tests conducted by the devices on the same unit under test are selectively displayed on the display, the switching component and the controller being housed in a separate housing from the plurality of devices and from the display.

22. The method of claim 21, further comprising:
connecting the devices and controller to a network;
providing commands to the controller from a remote location over the network; and
communicating with the devices over the same network.

* * * * *